(12) United States Patent
Amidon et al.

(10) Patent No.: US 8,548,918 B1
(45) Date of Patent: Oct. 1, 2013

(54) METHODS AND SYSTEMS FOR AUTOMATED CONTENT DISTRIBUTION

(75) Inventors: Christopher Amidon, Apex, NC (US); Richard Walsh, Raleigh, NC (US); Alfredo Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1026 days.

(21) Appl. No.: 11/640,577

(22) Filed: Dec. 18, 2006

(51) Int. Cl.
- *G06Q 30/02* (2012.01)
- *G06F 21/00* (2013.01)
- *G06Q 20/12* (2012.01)
- *G06Q 10/06* (2012.01)

(52) U.S. Cl.
CPC .......... *G06Q 20/123* (2013.01); *G06Q 10/0631* (2013.01); *G06Q 2220/10* (2013.01)
USPC ................. 705/51; 705/50; 705/59; 725/118; 709/238

(58) Field of Classification Search
None
See application file for complete search history.

(56) References Cited

U.S. PATENT DOCUMENTS

| | | |
|---|---|---|
| 5,220,657 A | 6/1993 | Bly et al. |
| 5,629,980 A | 5/1997 | Stefik et al. |
| 5,857,077 A | 1/1999 | Nakagaki et al. |
| 5,884,035 A | 3/1999 | Butman et al. |
| 5,892,900 A | 4/1999 | Ginter et al. |
| 6,088,702 A | 7/2000 | Plantz et al. |
| 6,149,441 A | 11/2000 | Pellegrino et al. |
| 6,314,409 B2 | 11/2001 | Schneck et al. |
| 6,338,086 B1 | 1/2002 | Curtis et al. |
| 6,389,541 B1 | 5/2002 | Patterson |
| 6,631,098 B2 | 10/2003 | Chang et al. |
| 6,748,420 B1 | 6/2004 | Quatrano et al. |
| 6,757,517 B2 | 6/2004 | Chang |
| 6,816,906 B1 | 11/2004 | Icken et al. |
| 6,832,245 B1 | 12/2004 | Isaacs et al. |
| 6,957,193 B2 | 10/2005 | Stefik et al. |
| 6,959,290 B2 | 10/2005 | Stefik et al. |
| 6,970,444 B2 | 11/2005 | Chwieseni et al. |
| 6,988,096 B2 | 1/2006 | Gupta et al. |

(Continued)

FOREIGN PATENT DOCUMENTS

| | | |
|---|---|---|
| CN | 1255793 A | 6/2000 |
| JP | 2005100325 | 4/2005 |

(Continued)

OTHER PUBLICATIONS

Abstract for JP 2005100325.

(Continued)

*Primary Examiner* — Calvin L Hewitt, II
*Assistant Examiner* — Mohammad A Nilforoush
(74) *Attorney, Agent, or Firm* — Withrow & Terranova, PLLC

(57) ABSTRACT

Content distributions may be optimized based on data from past distributions, including recipients, content metadata, and distribution path strength parameters. A content distribution package may be assembled, with the package including content metadata and an optimized distribution path. Clients that receive the package may modify the distribution. The details of the modified distribution may be reported back for inclusion in the distribution history records. In some embodiments, updates to the distribution records may be reflected in real-time such that ongoing distributions of content may be adjusted in response to feedback regarding distributions of other content. Each client may maintain a content management queue for users to specify, for each content package, which content is to be downloaded, which content is to be disregarded, and parameters and preferences for further distribution of the package itself.

11 Claims, 6 Drawing Sheets

(56) References Cited

U.S. PATENT DOCUMENTS

| | | | |
|---|---|---|---|
| 7,016,307 B2 | 3/2006 | Vasudev et al. | |
| 7,024,391 B2 | 4/2006 | Burich | |
| 7,047,202 B2 | 5/2006 | Jaipuria et al. | |
| 7,058,606 B2 | 6/2006 | Stefik et al. | |
| 7,069,308 B2 | 6/2006 | Abrams | |
| 7,281,274 B2 | 10/2007 | Manning et al. | |
| 7,383,433 B2 | 6/2008 | Yeager et al. | |
| 7,607,164 B2 | 10/2009 | Vasishth et al. | |
| 7,930,426 B1 * | 4/2011 | Li et al. | 709/207 |
| 2001/0049624 A1 * | 12/2001 | Uyama et al. | 705/14 |
| 2002/0026356 A1 * | 2/2002 | Bergh et al. | 705/14 |
| 2002/0052885 A1 | 5/2002 | Levy | |
| 2002/0091667 A1 | 7/2002 | Jaipuria et al. | |
| 2002/0124053 A1 | 9/2002 | Adams et al. | |
| 2002/0178164 A1 | 11/2002 | Wisniewski | |
| 2003/0009423 A1 | 1/2003 | Wang et al. | |
| 2003/0018582 A1 | 1/2003 | Yaacovi | |
| 2003/0018968 A1 | 1/2003 | Avnet | |
| 2003/0028639 A1 | 2/2003 | Yamamoto et al. | |
| 2003/0050977 A1 | 3/2003 | Puthenkulam et al. | |
| 2003/0055898 A1 | 3/2003 | Yeager et al. | |
| 2003/0131251 A1 | 7/2003 | Fetkovich | |
| 2003/0172034 A1 | 9/2003 | Schneck et al. | |
| 2003/0195851 A1 | 10/2003 | Ong | |
| 2003/0216824 A1 | 11/2003 | Chu et al. | |
| 2004/0039913 A1 | 2/2004 | Kruse | |
| 2004/0044774 A1 | 3/2004 | Mangalik et al. | |
| 2004/0103044 A1 | 5/2004 | Vandewater et al. | |
| 2004/0137882 A1 | 7/2004 | Forsyth | |
| 2004/0148275 A1 | 7/2004 | Achlioptas | |
| 2004/0148503 A1 | 7/2004 | Sidman | |
| 2004/0181487 A1 | 9/2004 | Hanson | |
| 2004/0193680 A1 | 9/2004 | Gibbs et al. | |
| 2004/0205358 A1 | 10/2004 | Erickson | |
| 2004/0210535 A1 | 10/2004 | Erickson | |
| 2004/0215793 A1 | 10/2004 | Ryan et al. | |
| 2004/0237045 A1 | 11/2004 | Meltzer | |
| 2004/0249768 A1 | 12/2004 | Kontio et al. | |
| 2004/0260968 A1 | 12/2004 | Edwards et al. | |
| 2004/0267625 A1 | 12/2004 | Feng et al. | |
| 2005/0015357 A1 | 1/2005 | Shahidi | |
| 2005/0021622 A1 * | 1/2005 | Cullen | 709/204 |
| 2005/0021750 A1 | 1/2005 | Abrams | |
| 2005/0044361 A1 | 2/2005 | Chang et al. | |
| 2005/0044411 A1 | 2/2005 | Somin et al. | |
| 2005/0091289 A1 | 4/2005 | Shappell et al. | |
| 2005/0091316 A1 | 4/2005 | Ponce et al. | |
| 2005/0138139 A1 | 6/2005 | Jain et al. | |
| 2005/0159998 A1 | 7/2005 | Buyukkokten et al. | |
| 2005/0165726 A1 | 7/2005 | Kawell et al. | |
| 2005/0195978 A1 | 9/2005 | Babic et al. | |
| 2005/0197846 A1 * | 9/2005 | Pezaris et al. | 705/1 |
| 2005/0198031 A1 | 9/2005 | Pezaris et al. | |
| 2005/0198305 A1 | 9/2005 | Pezaris et al. | |
| 2005/0203801 A1 | 9/2005 | Morgenstern et al. | |
| 2005/0204038 A1 | 9/2005 | Medvinsky et al. | |
| 2005/0210409 A1 | 9/2005 | Jou | |
| 2005/0216300 A1 | 9/2005 | Appelman et al. | |
| 2005/0232423 A1 | 10/2005 | Horvitz et al. | |
| 2005/0234864 A1 | 10/2005 | Shapiro | |
| 2005/0235062 A1 | 10/2005 | Lunt et al. | |
| 2005/0243736 A1 | 11/2005 | Faloutsos et al. | |
| 2005/0251553 A1 | 11/2005 | Goufried | |
| 2005/0256866 A1 | 11/2005 | Lu et al. | |
| 2005/0256909 A1 | 11/2005 | Aboulhosn et al. | |
| 2005/0262162 A1 | 11/2005 | Levy | |
| 2005/0262530 A1 | 11/2005 | Ruetschi et al. | |
| 2005/0266835 A1 | 12/2005 | Agrawal et al. | |
| 2005/0267766 A1 | 12/2005 | Galbreath et al. | |
| 2006/0004789 A1 | 1/2006 | Lunt et al. | |
| 2006/0004892 A1 | 1/2006 | Lunt et al. | |
| 2006/0015588 A1 | 1/2006 | Achlioptas et al. | |
| 2006/0020960 A1 | 1/2006 | Relan et al. | |
| 2006/0021009 A1 | 1/2006 | Lunt | |
| 2006/0031489 A1 | 2/2006 | Marcjan | |
| 2006/0048059 A1 * | 3/2006 | Etkin | 715/745 |
| 2006/0053209 A1 | 3/2006 | Li | |
| 2006/0053380 A1 | 3/2006 | Spataro et al. | |
| 2006/0089913 A1 | 4/2006 | Jaipuria et al. | |
| 2006/0095471 A1 | 5/2006 | Krikorian et al. | |
| 2006/0095976 A1 | 5/2006 | Torres et al. | |
| 2006/0107286 A1 | 5/2006 | Connor et al. | |
| 2006/0117090 A1 | 6/2006 | Schellingerhout et al. | |
| 2006/0117378 A1 | 6/2006 | Tam et al. | |
| 2006/0143068 A1 | 6/2006 | Calabria et al. | |
| 2006/0143236 A1 | 6/2006 | Wu | |
| 2006/0146765 A1 | 7/2006 | Van De Sluis et al. | |
| 2006/0167855 A1 | 7/2006 | Ishikawa et al. | |
| 2006/0173873 A1 | 8/2006 | Prompt et al. | |
| 2006/0184997 A1 | 8/2006 | La Rotonda et al. | |
| 2006/0190281 A1 | 8/2006 | Kott et al. | |
| 2006/0200434 A1 | 9/2006 | Flinn et al. | |
| 2006/0218225 A1 | 9/2006 | Hee Voon et al. | |
| 2006/0218577 A1 | 9/2006 | Goodman et al. | |
| 2006/0248122 A1 | 11/2006 | Nikiel et al. | |
| 2006/0259957 A1 | 11/2006 | Tam et al. | |
| 2007/0106551 A1 | 5/2007 | McGucken | |
| 2007/0192299 A1 | 8/2007 | Zuckerberg et al. | |
| 2007/0220575 A1 | 9/2007 | Cooper et al. | |
| 2007/0255785 A1 | 11/2007 | Hayashi et al. | |
| 2008/0120397 A1 * | 5/2008 | Hartman | 709/218 |

FOREIGN PATENT DOCUMENTS

| | | |
|---|---|---|
| WO | WO 2005006152 | 1/2005 |
| WO | WO 2005/111760 A1 | 11/2005 |
| WO | 2006047879 A1 | 5/2006 |
| WO | WO 2007/070676 A2 | 6/2007 |

OTHER PUBLICATIONS

Homepage for www.foaf-project.org (accessed Jul. 13, 2007) —1 page.
No Author, Architecture of Windows Media Rights Manager, (website), May 2004, 5 pages, www.microsoft.com/windows/windowsmedia/howto/articles/drmarchitecture.aspx.
International Search Report mailed Mar. 18, 2008, for PCT/US07/77185, 2 pages.
Office Action issued Mar. 1, 2012, for Chinese Patent Application No. 200780041126.1, 18 pages.
European Search Report for European Patent Application No. 07841587.4 (PCT/US2007/0077185) mailed May 24, 2013, 5 pages.

* cited by examiner

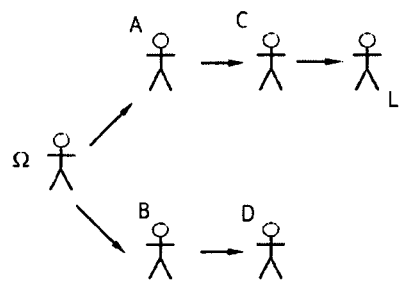
FIGURE 5: First Exemplary Distribution
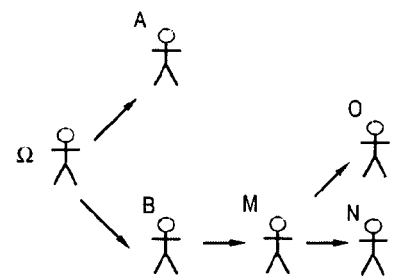
FIGURE 6: Second Exemplary Distribution
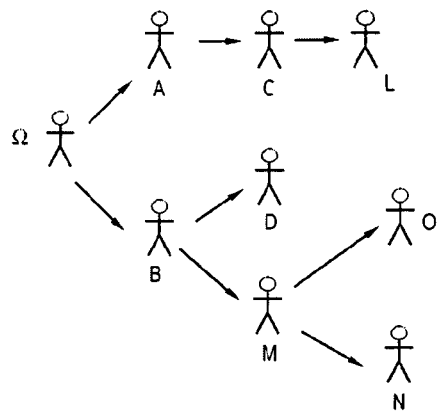
FIGURE 7A: Combined Distribution Network
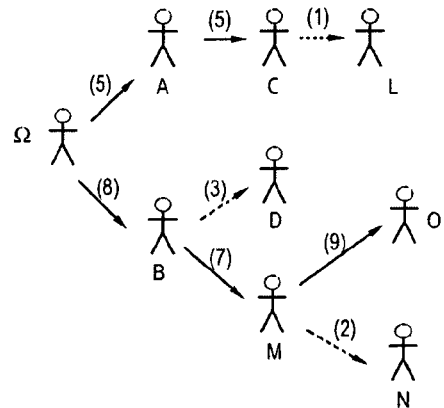
FIBURE 7B: Optimized Distribution Network

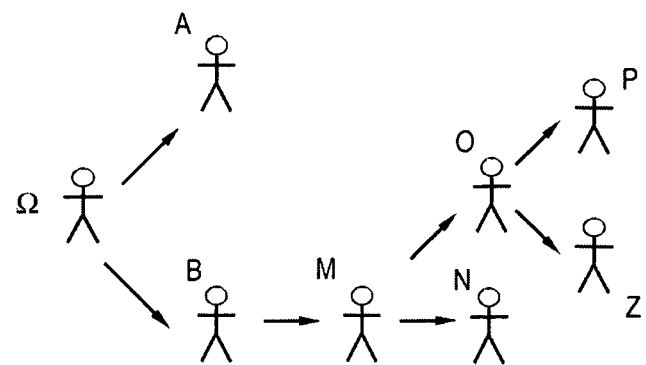
FIGURE 9A: Second Exemplary Distribution (Updated)
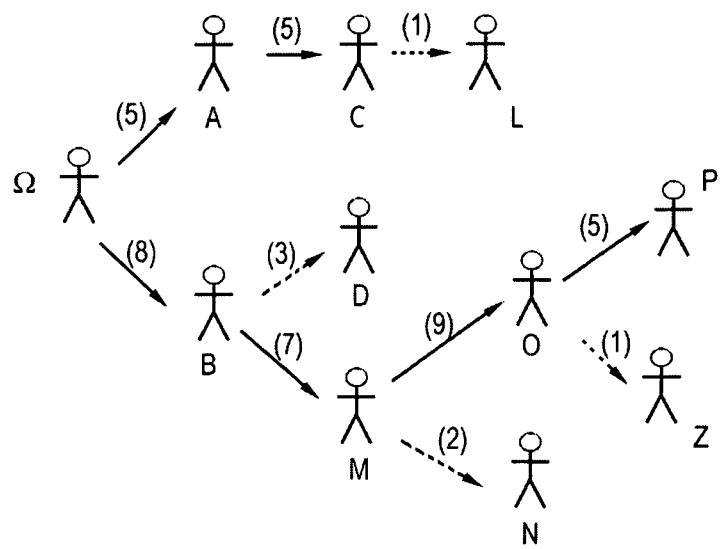
FIGURE 9B: Updated Optimized Distribution Network

METHODS AND SYSTEMS FOR AUTOMATED CONTENT DISTRIBUTION

FIELD OF THE INVENTION

The present invention relates generally to computer networks, including systems and methods for sharing digital content.

BACKGROUND OF THE INVENTION

Increases in the processing, memory, and connectivity capabilities of computing devices have fueled an explosion in digital content sharing. Such digital content includes pictures, movies, audio, textual, and virtually any other type of representation that can be rendered in or converted to a digital form. Many different content sharing systems are in use and have been proposed for sharing digital content. For example, some systems use peer-to-peer networking (P2P) for content sharing, while other systems use one or more centralized servers that coordinate sharing among a plurality of client devices. Still further systems use combinations of the client-server model and P2P model.

Various systems, P2P and otherwise, have been proposed for the "viral" distribution of content. Generally speaking, "viral" content distribution refers to indirect spreading of content. For instance, a person may create a home video for fun and share it with some immediate friends. Those friends may share the video with other friends, who then spread the video still further.

Some systems provide for limited viral distribution whereby the content originator retains some control over the content distribution. For instance, U.S. patent application Ser. No. 11/516,294, filed Sep. 6, 2006 and assigned to Qurio Holdings, Inc., includes discussion of systems whereby an originator of content may specify rules and limits regarding the ultimate distribution of content. The rules, distribution limits, and other parameters may be included as content metadata associated with the virally-spread content.

Many variants of P2P systems exist. Some P2P systems may utilize a distribution protocol such as BitTorrent, which allows multiple clients to share multiple components of a digital file. A "torrent" file includes metadata describing file(s) to be shared and a computer coordinating the sharing. Other computers download the shared file(s) in pieces. Since the shared file(s) may be broken down into pieces, clients may share and trade pieces rather than download the complete file from a single source.

Some content distribution systems allow for tracking of past distributions. For example, systems have been proposed whereby downstream recipients of content report back to the originator and/or sender of content. The reported-back information can be used to trace the path(s) of prior distributions.

However, in many currently-existing systems that provide for virally-spread content, each distribution is manual, and may not take full advantage of data about other distributions. Therefore, an improved content distribution system remains desirable.

SUMMARY OF THE INVENTION

Objects and advantages of the present invention will be apparent to one of ordinary skill in the art upon careful review of this disclosure. Such objects and advantages include providing improved methods and systems for content distribution, including systems that optimize content distribution based on data including, for example, past distributions of content and/or distribution preferences of one or more users in the content distribution path.

This disclosure uses the term "originating user" to indicate a user who is the initial source of a particular instance of content distribution. However, one of skill in the art will appreciate that the originating user may not necessarily have created the content, but may simply be relaying content from another source. Similarly, the term "newly distributed content" is used in the relative sense to distinguish content that is about to be distributed (i.e. the "newly-distributed content") from content that has already been distributed or is in the process of distribution. One of skill in the art will further appreciate that the terms "user" and "users" are not meant to limit the presently-disclosed teachings to individual natural persons; rather, a user may comprise an individual, a group of individuals, other entities such as corporations, partnerships, and other organizations, or even computer systems.

In embodiments of the presently-disclosed invention, distribution of content can be optimized based on data including past distributions of other content. Additionally, rather than distributing entire content files, a distribution package may be sent to one or more clients, with each client using data included with the distribution package to obtain the actual content. Each client may evaluate data included in the distribution package to select and prioritize content access.

A method of automated content distribution may be carried out by one or more computing devices. Embodiments of the method can include receiving proposed distribution data for newly-distributed content. The proposed distribution data may include an initial distribution list and metadata describing the newly-distributed content. The computing device(s) can then access distribution history data. The distribution history data may include data regarding one or more previous distributions of other content. That data can include, for example, for each prior distribution, all or part of the distribution path(s) for the other content and content metadata describing the previously-distributed content. Based on the data from the previous distribution(s) and the data about the proposed distribution, an optimal distribution path for the newly-distributed content can be determined.

The optimal distribution path can be determined in a number of ways. For example, the history data for prior distribution(s) may be searched for prior distributions of content similar to the newly-distributed content. For example, content metadata for the newly-distributed content may be compared to metadata associated with the previously-distributed content. As a further example, history data regarding one or more prior distributions having the same initial recipients may also be compared. The prior distribution path(s) may be aggregated into a combined distribution path, which may be adjusted as is known in the art to eliminate duplicate paths, provide for different level placements for clients, and so on.

The links in the combined distribution path may then be evaluated, for example, by calculating the relationship between each linked client. The relationship strengths may be compared to a threshold value to determine which clients are to be included in the optimal distribution path so that the optimal distribution path includes only those clients connected by a link of adequate strength.

Relationship strength for a path may be evaluated using any number of parameters, including, but not limited to, the number of previous distributions along the path, number of distributions along the path for a particular type or types of content, distribution history of the sending user, distribution history of the receiving user, recency of past distributions and other activity, consumption of previously-distributed content by the sending user and/or receiving user, user-designated preferences and profiles for the sending user and/or the receiving user. The originating user may provide for some factors to be more heavily weighed in the strength calculation than others.

The proposed distribution may be provided by a first computing device to an optimizing computing device, which returns the optimized distribution path to the first computing device. The first computing device may then include the optimized distribution path and content metadata in a content distribution package, with the package sent to the initial clients in the distribution path.

When a client receives a distribution package, one or more processes running on the client access the distribution package. Each client may determine whether to distribute the distribution package in accordance with the specified path, or may distribute the package more narrowly or widely than specified in the package. Each client may further provide distribution progress data to the optimizing computing device, for example, by indicating additional clients added to the path or removed from the path for the distribution.

The optimizing computing device(s) may receive the distribution progress data and add it to the distribution history data. Future optimized distributions may thus be influenced by the progress of past distributions. For example, if a particular client not included in the initial distribution path is added during the distribution and acts as a reliable or otherwise favorable distribution link for certain type(s) of content distributions, the client may be added to the distribution path as part of optimizing in future distributions. Alternatively, if a client included in optimized distributions is often later removed from distributions of certain content, the client may eventually be removed from optimal distributions for that type of content or its role may be otherwise reduced. Distribution progress data may also include data from each client regarding other actions taken by the client with regard to a distribution. For example, if a client disregards certain types of content, disregards content from certain originating clients, and/or disregards content received from certain clients elsewhere in the distribution path, the path may be altered.

In some embodiments, the updates to the distribution history may be used to adjust other distributions that are already in progress. For example, progress data related to a first distribution may impact the optimal distribution path for a second distribution, such as by changing the relationship strength between a client in the path and a client not in the path. If the second distribution is initiated before the receipt of the progress data related to the first distribution but is still ongoing, the optimizing computing device may send data to one or more clients in the (original) optimal path to update to optimized distribution. For instance, the optimizing client may determine which clients in the (original) optimal path have not yet provided progress data as to the second distribution and issue an update to those clients.

A client application may comprise instructions rendered in one or more computer readable media that configure at least one computing device to perform actions. The actions may include receiving a content distribution package that includes data identifying a distribution, at least part of a distribution path for the package, and metadata describing content associated with the distribution package. The client application may generate distribution feedback data, including data identifying one or more actions taken by the client in response to receiving the distribution package. The feedback data may include subsequent distributions and/or modifications of the package and/or other actions taken by the client with regard to the package. For example, the feedback data may also specify whether the client downloads the content associated with the package and/or whether the downloaded content is viewed. As will be discussed in further detail herein, the feedback data may include details to any suitable degree of granularity, including details of how content is viewed or otherwise consumed, such as the number of times or manner in which a movie is viewed, for example.

The client application may place the distribution package in a content queue and generate one or more user notifications identifying the distribution package. The notifications may include, for example, a pop-up notification, an instant message, e-mail message, audio effect, visual effect, and/or other communication to a user. The client application may, based on data included with the distribution package, access one or more computing devices to obtain the content. For example, the client application may download the content from one (or more) of the other clients as specified in the distribution path included with the distribution package. The download or other content access functionality may be provided by one or more other applications, components, or processes on the computing device. For example, the client application may itself be a component in a peer-to-peer (P2P) content distribution system client application.

The client application may send the content distribution package to at least one other client, and include data identifying the subsequent distribution(s) in the distribution feedback data. For example, the client application may send the distribution package to one or more clients specified in the distribution path. The client application may alter the received distribution path at least in part and then send the content in accordance with the modified distribution path. For example, a client may add and/or subtract other clients from the distribution path before sending the package onward. The modification decisions may be based on comparing the path strength to one or more threshold parameters of the distributing client. The threshold parameters may include, for instance, the number of levels away from the originating user, the content type, the content owner, and/or content metadata.

An automated content distribution system can comprise one or more optimization computing devices that access instructions stored in one or more computer-readable media. The instructions configure the optimization computing device(s) to perform actions including accessing distribution history data, accessing proposed distribution data, and generating optimized distribution data based on the proposed distribution data and distribution history data. For instance, as discussed above, generating optimized distribution data may include determining strengths and weaknesses in previous distribution paths for content similar to the content associated with the proposed distribution data.

At least one optimization computing device may comprise an optimization server, and the system may further comprise a plurality of client devices. The clients may send the proposed distribution data to the optimization server, with the server returning the optimized distribution data to the requesting client. The requesting client may then distribute a content distribution package based on the optimized distribution data. Each client may receive a distribution package and re-distribute the package and report data back to the optimization computing device. The reported data may be incorporated into the distribution history data. Each client may expand or contract the extent of the distribution, and some clients may not re-distribute the package at all.

In some embodiments, each client itself acts as an optimization device for its own distributions. For example, each client may maintain a history of past distributions. Upon receipt of a distribution package from another client, a client may access the history of past distributions and optimize the distribution of the received package. After distributing the package, the client may report the extent of the distribution back to one or more clients in the distribution chain. For instance, the client may report to the originator of the package. Alternatively or additionally, the client may report back to the client(s) who sent the distribution package.

BRIEF DESCRIPTION OF THE SEVERAL VIEWS OF THE DRAWINGS

A full and enabling disclosure including the best mode of practicing the appended claims and directed to one of ordinary skill in the art is set forth more particularly in the remainder of the specification. The specification makes reference to the appended figures, in which:

FIG. 5 is a diagram showing the path taken by a first exemplary distribution of content;

FIG. 6 is a diagram showing the path taken by a second exemplary distribution of content;

FIG. 7A is a diagram showing a combined distribution network based on the first and second exemplary distributions;

FIG. 7B is a diagram showing an optimized distribution path based on the combined distribution and further indicating path link strengths;

FIG. 9A depicts an updated version of the path taken by a second exemplary distribution of content; and FIG. 9B depicts an exemplary revision to the optimized distribution path of FIG. 7B based on a combined distribution including the updated path from FIG. 8.

Use of like reference numerals in different features is intended to illustrate like or analogous components.

DETAILED DESCRIPTION OF THE PREFERRED EMBODIMENTS

Figure 1:
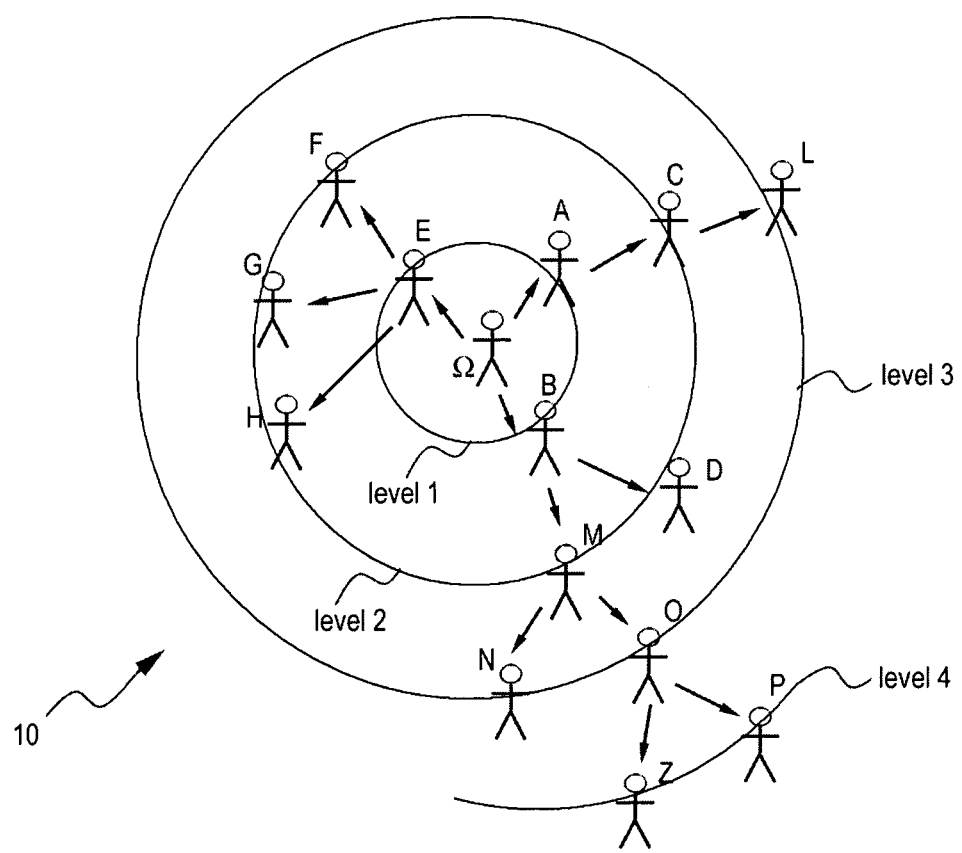
FIG. 1 is a diagram of an exemplary distribution network.

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The technology discussed herein makes reference to servers, databases, software applications, and other computer-based systems, as well as actions taken and information sent to and from such systems. One of ordinary skill in the art will recognize the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel. When data is obtained or accessed between a first and second computer system or component thereof, the actual data may travel between the systems directly or indirectly. For example, if a first computer accesses a file or data from a second computer, the access may involve one or more intermediary computers, proxies, and the like. The actual file or data may move between the computers, or one computer may provide a pointer or metafile that the second computer uses to access the actual data from a computer other than the first computer, for instance.

The present disclosure also makes reference to the relay of communicated data over a network such as the Internet. It should be appreciated that such network communications may also occur over alternative networks such as a dial-in network, a local area network (LAN), wide area network (WAN), public switched telephone network (PSTN), the Internet, intranet or Ethernet type networks and others over any combination of hard-wired or wireless communication links.

The various computer systems discussed herein are not limited to any particular hardware architecture or configuration. Any suitable programming, scripting, or other type of language or combinations of languages may be used to implement the teachings contained herein. Embodiments of the methods and systems set forth herein may be implemented by one or more general-purpose or customized computing devices accessing software instructions rendered in a computer-readable form. Embodiments of the methods and systems set forth herein may also be implemented by hard-wired logic or other circuitry, including, but not limited to application-specific circuits. Of course, combinations of computer-executed software and hard-wired logic may be suitable, as well.

Embodiments of the methods disclosed herein may be executed by one or more suitable computing devices. Such devices may access one or more computer-readable media that embody computer-readable instructions which, when executed by at least one computer, cause the at least one computer to implement one or more embodiments of the methods disclosed herein. Furthermore, components of the presently-disclosed technology, such as knowledge bases and data stores, may be implemented using one or more computer-readable media. Any suitable computer-readable medium or media may be used, including diskettes, drives, and other magnetic-based storage media, optical storage media, including disks (including CD-ROMS, DVD-ROMS, and variants thereof), flash, RAM, ROM, and other memory devices, and the like.

The present disclosure provides several examples of content sharing with regard to certain types of content, such as videos and audio files. However, one of ordinary skill in the art will understand that the principles and teachings contained herein are applicable to transfer of any type of digital asset using networked computing devices.

FIG. 1 illustrates an exemplary distribution network 10 comprising a plurality of users who have virally distributed content to one another. As will be discussed in detail below, each user is associated with one or more networked computing devices that facilitate content sharing amongst the users. User Ω represents the "originator" of shared content. As noted above, the originator may produce the content, but may alternatively relay content that was produced by others. Users A, B, and E represent "level 1" users, that is, users who received the content directly from the originator Ω. Users C, D, F, G, H, and M are all "level 2" users who received the content directly from a "level 1" user. Users L, N and O represent "level 3" users who received the content directly from a "level 2" user. Users Z and P represent "level 4" users. Distributions may continue outward in a similar fashion from level 4, subject to restrictions (if any) on the distribution of user Ω's content. Examples in the present disclosure will use all or parts of distribution network 10 to illustrate various aspects and embodiments of the presently-disclosed subject matter. Although the figures provided herein use a diagram form, it will be appreciated that social networks may be illustrated in many different ways. For example, a social network can be visualized as a circle, a tree or graph, a diagram, a node map with expandable/collapsible nodes, a table, etc. The extent of membership and connections between members shown in FIG. 1 and the other examples here is for purposes of illustration only; the present subject matter may be used with more or less extensive social networks and/or distribution networks than shown in the examples herein. Furthermore, although the distribution network shown in FIG. 1 uses integer levels, other level designations and calculations may be used depending on the particular distribution methodology the optimization system/process is supporting.

Figure 2:
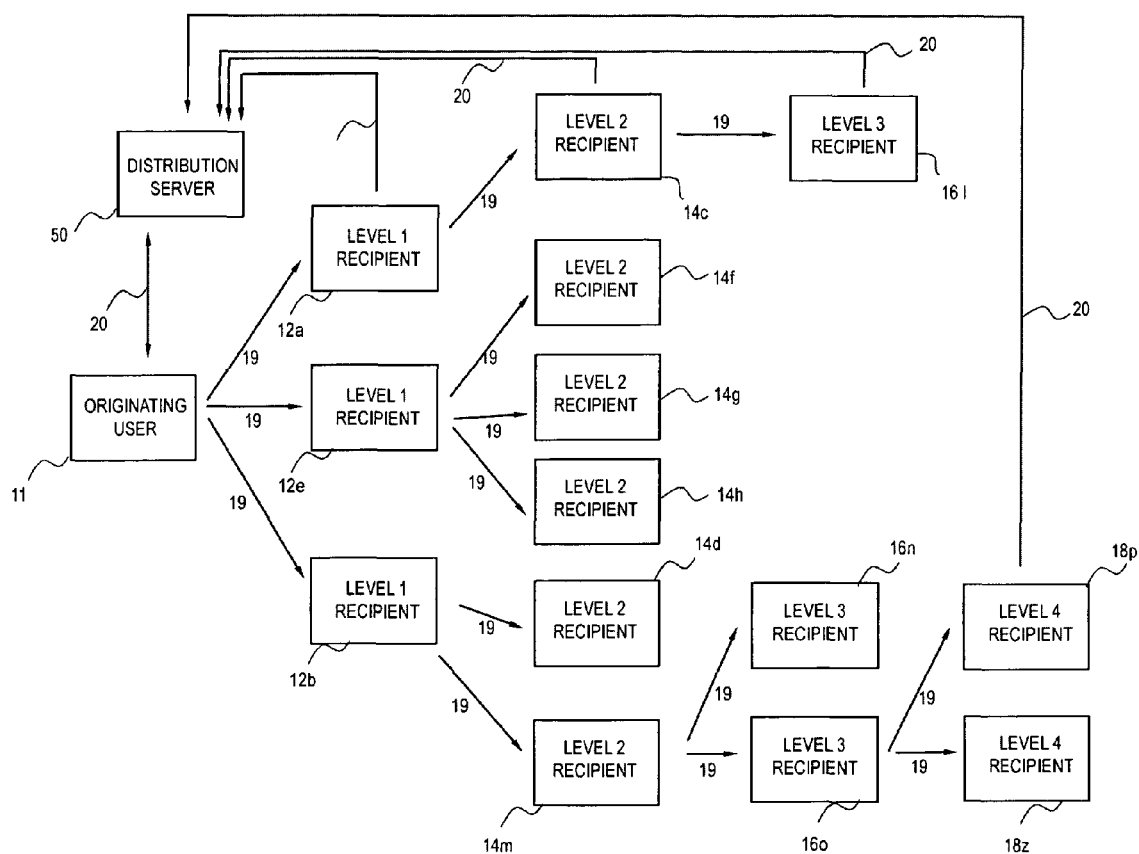
FIG. 2 is a block diagram of an exemplary content distribution system.

FIG. 2 is a block diagram representing exemplary components and network interaction amongst a plurality of peer clients and an optimization server. In this example, content distribution among the devices of distribution network 10 is illustrated. Originator Ω identifies digital content that is to be shared with others in a network using computing device 11. Although shown in the figure as single computing devices, some or all users may utilize multiple computing devices in combination for content sharing and distribution. Originating computing device 11 is connected to level 1 computing devices 12a, 12e, and 12b, which correspond to users A, E, and B. Level 2 computing devices 14c, 14f, 14g, 14h, 14d, and 14m represent machines associated with level 2 users C, F, G, H, D, and M, respectively; level 3 machines 16l, 16n, and 16o are associated with level 3 users L, N, and O, respectively; while devices 18p and 18z are associated with level 4 users P and Z, respectively. Each computing device is connected to another peer device by peer connections 19. Peer connections 19 may represent continuous or intermittent connections between various clients. Although single peer connections are shown between each pair, some or all peers may connect to multiple peers simultaneously and/or maintain more than one connection to any particular peer at a time. Furthermore, the connections 19 in FIG. 2 show unidirectional arrows to denote exemplary distribution direction of content packages; one of skill in the art will recognize that the distribution of content packages (and other data) may utilize bidirectional links in practice.

Server connections 20 are illustrated between several of the computing devices and content distribution server 50; one of skill in the art will appreciate that each peer computing device may be connected by server connections 20 to distribution server 50, but such connections are not shown in the figure for the sake of clarity. Alternatively, in some embodiments, only some client devices connect to distribution server 50, and in still further embodiments, no clients connect to distribution server 50. Furthermore, although direct links are shown between clients and the distribution server, one, some, or all such links may be indirect. For example, clients may connect to the server by way of one or more upstream (or other) clients. Such alternative embodiments will be discussed in further detail later in this disclosure. As was noted above with regard to links 19, server links 20 may utilize bidirectional or unidirectional links in practice as required, and the particular depiction of arrows is not meant to be limiting.

One of skill in the art will understand that any connections, including peer connections 19, server connections 20, and any other connections may be direct or indirect connections. Furthermore, such connections may occur on a continuous basis, a regular basis, or an intermittent basis as needed for data exchange/transfer. Any suitable network connection protocols, topologies, and medium may be used, and the various devices may be connected by various different types of connections. Furthermore, some or all connections and/or communications may be encrypted or otherwise secured.

Figure 3:
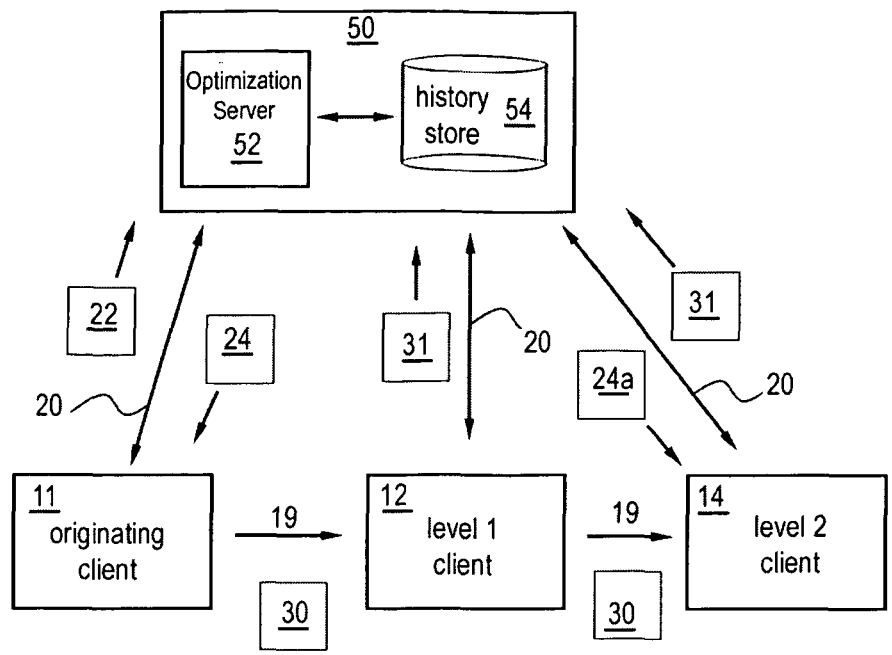
FIG. 3 is a block diagram of exemplary optimization device components in a content distribution system.

FIG. 3 illustrates distribution server 50 and representative client devices in further detail. An originating device 11, level 1 device 12, and level 2 device 14 are shown for purposes of illustration. Furthermore, in this example, distribution server 50 supervises the content distribution process and includes distribution path optimization functionality provided by optimization server 52 in conjunction with distribution history store 54. For example, distribution server 50 may provide rights propagation and content distribution management functionality in a manner as discussed in U.S. patent application Ser. No. 11/516,294, entitled SYSTEM AND METHOD FOR CONTROLLED VIRAL DISTRIBUTION OF DIGITAL CONTENT IN A SOCIAL NETWORK, filed Sep. 6, 2006 and assigned to Qurio Holdings, Inc., which is incorporated by reference for all purposes herein.

However, regardless of the underlying distribution architecture, the present subject matter adds distribution path optimization functionality. In this example, optimization server 52 is represented as an additional device interacting with content distribution server 50. However, in alternative embodiments, optimization server 52 is integrated as one or more components in a content distribution system, such as a server process running on one or more devices that provide additional optimization and/or content-sharing options. In still further alternative embodiments, optimization server 52 may provide optimization services to a peer-based distribution system that does not otherwise access a central server.

In the presently-illustrated embodiments, content is distributed by way of distribution packages, such as distribution package 30 shown in FIG. 3. The distribution package is initially sent by originating device 11 to one or more level 1 devices 12, and so on. Upon receipt of distribution package 30, a recipient may use data contained therein to access one or more resources to obtain the actual distributed content file(s). In some embodiments, distribution package 30 includes a unique distribution ID and content metadata identifying attributes of the content (title, owner, duration, quality, etc.), one or more network resources for access to the content, and at least part of the distribution network. For example, the network resource identified in distribution package 30 may include a torrent or other network identifier for access to the content. When used in embodiments supporting additional distribution functionality, such as control of access and/or alteration rights, distribution package 30 may further include data identifying the current access level, content augmentation rules, and so on.

Regardless of the distribution architecture, optimization server 52 accesses distribution history data, shown in FIG. 3 as history store 54. History store 54 comprises any suitable arrangement of computer-readable storage devices maintaining data describing previous content distributions. For example, history store 54 may comprise one or more databases including a plurality of data records, with one or more records corresponding to a particular distribution. The record(s) for each distribution may identify the distribution by a unique identifier and set forth the distribution path of one or more content files (i.e. the path traversed by content distribution packages associated with the content file(s)). Each record may further include content metadata describing the substance of the distributed content. Content metadata may include any suitable information including, but not limited to, the title of a file, one or more descriptions of the content (such as subject tags), creation and modification dates, identifiers of the source of the content, file size, annotations, comments, summaries, and the like.

The record for each distribution in history store 54 may include data identifying the extent of the previous distribution. However, the record may contain more than just an illustration of the users that received the content distribution (i.e. a recipient list), instead comprising data indicating what one or more recipients did (and/or did not do) upon receipt of the distribution. For example, in the exemplary embodiments discussed in the present disclosure, content distribution is managed by sending distribution packages between clients, with each client then using data included in the distribution package to download or otherwise access the distributed content. In such embodiments, the distribution history record may include data specifying whether or not each user downloaded the content specified in the distribution record, and, if the content was downloaded, whether or not the content was played back, viewed, or otherwise accessed. Data regarding content consumption may be maintained to varying degrees of granularity. For example, if the content is a movie file, the history record may indicate how many times the movie was viewed, length of playback, points at which the movie was fast-forwarded, rewound, and so on. History data may further include records of any annotations, deletions, or other alterations made to the content and/or any classifications such as tags associated with the content by downstream users.

To initiate a distribution, originating user $\Omega$ (by way of device 11) initially provides proposed distribution data 22 to optimization server 52. Based on the proposed distribution data 22 and distribution history data from store 54, optimization server 52 returns optimized distribution data 24, which can include an optimized distribution path. Based on the optimized distribution data 24, device 11 prepares a distribution package 30 and sends it out in accordance with the optimized distribution data. Downstream clients such as level 1 recipient device 12 and level 2 recipient device 14 may further distribute the package based on the optimized path. Redistribution by downstream clients may depend on additional factors and conditions as will be discussed below.

Some or all downstream clients report back distribution progress data 31 to optimization server 52, which may use the progress data to update distribution history store 54. For purposes of clarity, only some downstream clients are shown as connected to server 50; however, one of skill in the art will recognize that any of the clients could be so connected. Although progress data 31 is shown as being reported back using server connections 20, one of skill in the art will recognize that progress data may be reported back in additional or alternative manners. For example, a downstream client may report distribution progress data 31 indirectly via one or more upstream clients. Also, as will be discussed in detail below, in some embodiments, ongoing distributions may be updated to reflect changes in optimization data. Such an update for device 14 is shown in FIG. 3 as optimization update data 24*a*. Although shown as traveling via a direct connection between device 14 and the server, one of skill in the art will appreciate that update data may be provided directly over server connection(s) 20 and/or indirectly by distribution through the network.

Figure 4:
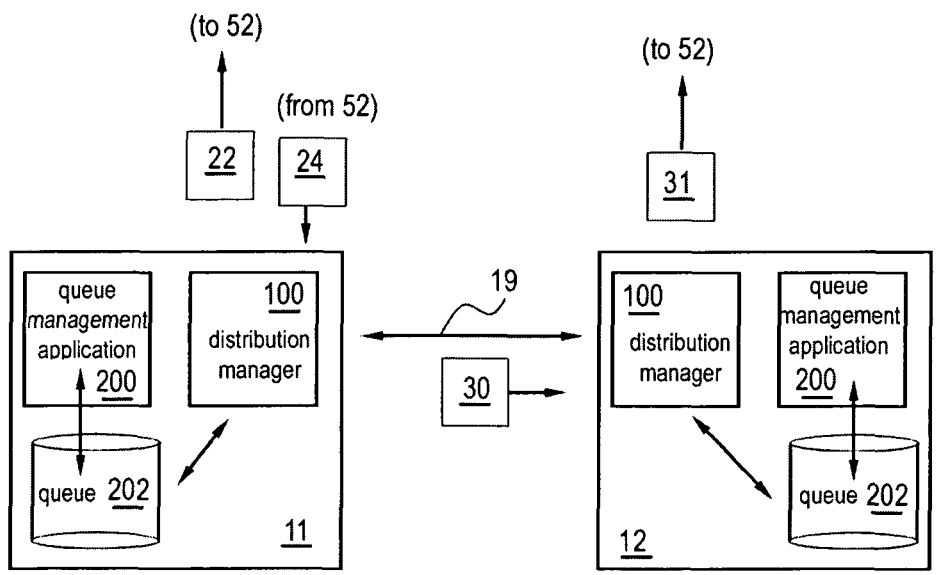
FIG. 4 is a block diagram of exemplary distribution peer components suitable for use in a content distribution system.

Each client device executes computer code embodied in one or more computer-readable media to provide client functionality including distribution manager and queue management functionality. FIG. 4 illustrates representative originating client device 11 and a representative downstream device (in this case, a level 1 device 12) in further detail. Each client device includes distribution manager 100 and queue management application 200. Either or both distribution manager 100 and/or queue management application 200 may be implemented as standalone applications or may comprise components, modules, processes, or other parts of one or more other applications executed by each client device. For example, distribution manager 100 and/or queue management application may be implemented as part of or to interoperate with other applications including, but not limited to: a content-sharing application, messaging application, content-creation/editing application, social network application, operating system, and the like.

Distribution manager 100 supervises the receipt and distribution of content packages such as the illustrated content package 30. When a distribution package is received, distribution manager 100 places the package (or a designation thereof) into content queue 202. Distribution manager 100 further provides distribution progress data 31 to one or more optimization servers such as server 52 to report back the client's actions taken with regard to content packages. When a computing device (such as device 11) originates distribution of newly-distributed content, distribution manager 100 further communicates with one or more optimization servers 52 to provide proposed distribution data 22 and obtain optimized distribution data 24, which may include a distribution list as will be discussed below.

Queue management application 200 provides options for the user of the computing device to control and prioritize download of the actual content identified in the packages placed in queue 202 by distribution package 30. Furthermore, queue management application 200 may provide the receiving user with options for controlling the distribution of received content packages, such as expanding or reducing the receiving client's subsequent distribution of the package.

Several examples of content distribution by user $\Omega$ using computing device 11 will now be discussed. However, one of skill in the art will recognize that user $\Omega$ and device 11 are simply representative of any user and respective computing device in the system that is originating content; for instance, device 11 and devices such as 12, 14, 16, 18, etc. may equally be used to relay content and/or initiate distributions.

Initially, user $\Omega$ configures distribution parameters in accordance with the system that user $\Omega$ is using for content distribution. For example, if the content distribution system supports control of distribution levels and/or provides for control of different versions for different users, the user may set access levels and other rights management controls using a content distribution management application. Finally, user $\Omega$ specifies an initial distribution list and initiates the distribution. At this point, the optimization system enters the distribution process. As shown in FIG. 3, computing device 11 provides proposed distribution data 22 to distribution server 52. In this illustration, the proposed distribution data 22 may be included along with the rights controls, access levels, and other system-specific data used by content distribution server 50. However, for path optimization, proposed distribution data 22 includes at least one parameter by which the system can determine which path(s) are more optimal than others. For instance, the parameter(s) may include, but are not limited to, content metadata identifying the content to be distributed. Depending upon what user $\Omega$ has provided, proposed distribution data 22 may further include distribution preferences and/or an initial distribution list. As will be apparent to one of skill in the art, the presently-disclosed technology allows for an automated determination of content distribution based on content metadata and user preferences. However, some or all user preferences may be maintained by optimization server 52 and so may not necessarily be sent for each distribution.

Based on the proposed distribution data 22, optimization server 52 accesses distribution history store 54 to determine any previous distributions that may be used as a basis for a distribution of the newly-distributed content. For example, optimization server 52 may search records of prior distributions to determine previous distribution patterns for content having similar characteristics to the newly-distributed content. For example, content metadata may be matched to determine which previous distribution record(s) match. The acceptable degree of matching may be specified, for example, by preferences of user $\Omega$ stored at server 52 and/or included with the proposed distribution data 22. Additional criteria that may be used to match previous distribution records include the initial distribution data included in proposed distribution data 22 (if any). For example, if user $\Omega$ specifies one or more recipient users, server 52 may further access records of previous distributions with paths that include the specified user(s). Furthermore, user $\Omega$ may specify a previous distribution path or portion thereof as part of proposed distribution data 22.

Once one or more prior distribution records have been matched for the proposed distribution, the distribution paths for the prior records may be combined. For example, numerous methods and systems may be utilized to combine distribution paths to reduce redundant paths, adjust user levels, and the like. However, in alternative embodiments, the paths of several different distributions may simply be combined into a single unified path. Regardless of the methodology used, the combined path may be optimized by optimization server 52 in accordance with user $\Omega$'s preferences to obtain an optimized distribution path. The optimized distribution path may then be used by user $\Omega$'s computing device in automatically distributing content via distribution packages sent from one client to another based on the optimized path.

In some embodiments, optimization server 52 may be configured to generate multiple proposed optimized distribution paths for selection by user $\Omega$. For example, user $\Omega$ may be presented with a preview of each of several optimized paths for selection. User $\Omega$ may be able to specify different preferences, rules, and other parameters to be used in optimizing distributions, such as preferred manner(s) of calculating path strengths, desired extent of distributions, and/or preferred users to be included in the path. For example, if user $\Omega$ indicates that a limited distribution is preferred, the optimization process may proceed to a different conclusion than if user $\Omega$ indicates that the widest possible distribution is preferred.

In some embodiments, optimization server 52 may determine relationship strengths characterizing the link between each user in the path. In such embodiments, as part of the distribution preferences, user $\Omega$ may specify a threshold value specifying one or more parameters governing inclusion of particular links in the distribution path for the newly-distributed content. The relationship strength may be compared to the threshold value by server 52, and any links that do not satisfy the threshold value may not be included in the optimized distribution path.

Optimization server 52 may calculate the relationship strength in a number of ways based on data included in distribution history store 54. For example, for each link, optimization server 52 may access data indicating the number of previous distributions along the path, number of distributions along the path with for a particular type or types of content, distribution history of the sending user, distribution history of the receiving user, recency of past distributions and other activity, consumption of previously-distributed content by the sending user and/or receiving user, user-designated preferences and profiles for the sending user and/or the receiving user. Users may provide profiles to the system in which distribution preferences, rules, and other parameters are specified. For example, users may use profiles to opt out of certain distributions, prioritize other distributions, and otherwise control their participation in distributions. Optimization server 52 may be configured to use such profile information in assessing relationship strengths and assembling distribution lists so that user desires are respected by the system.

Relationship strength may be based on device and/or network characteristics. For example, as part of calculating relationship strength, one or more device profiles may be consulted. For example, certain devices may not support certain file formats. Based on the profile data, users associated with certain device types may not be included in distributions of incompatible files. As another example, distribution history data may include data related to how data actually traversed the network in past distributions—for example, communication attempts/failures, download time (for packages and/or related content), and other indications of network robustness may influence the calculation of an optimized path. For instance, a particular node may be favorable based on social network considerations such as number of connections to other users. However, the node may not be the best part of a distribution path based on real-world network issues; for example, the node may be associated with an unreliable internet connection such that repeated attempts are required to send a package to the node. Another network consideration may include the amount of feedback provided to the optimization system—in some embodiments, the system may favor nodes that report back detailed distribution history feedback data more than nodes that provide little to no feedback.

Other parameters that are used in calculating relationship strength and determining optimized distribution paths may be contextual based on data regarding the status of users and/or devices in the distribution network. For example, contextual data may be provided by clients in the distribution system to server 52 as part of distribution feedback data 31 and/or as part of other data updates provided by clients in the system to the server(s). For instance, relationship strength may be evaluated at least in part by determining the geographical distance between users in a particular path and/or relative to the originating user. User locations may be obtained based on data from location-based services, such as Global Positioning System (GPS) data, network address tracing, and the like that is provided to the optimization system from each user. Distributions may be optimized based on device status and connectivity. For example, clients may provide status and device updates—for instance, a user may log out of the system from a personal computer and log into the system using a mobile device, such as a cell phone. If the cell phone has lower connectivity capability than the personal computer, the user associated with the device may play a more reduced role in the distribution process until the user returns to his or her PC. Returning again to the compatibility example, a user may provide a profile or profiles indicating that the user is associated with a Windows-compatible device and an Apple-compatible device. Depending upon which computer is active, the user may be included in some distributions and excluded from others. For instance, if the contextual data indicates that the Windows-compatible device is idle but the Apple-compatible device is active, the user may be excluded from distributions of movies unplayable on the Apple-compatible device.

Factors such as those listed above may be weighted more heavily than the others in the strength calculation. For example, originating user Ω may provide that the strength of a link should be based largely on whether or not content of a certain type of content is distributed across the link or is stopped by one of the users. The factors may be weighed in any suitable manner, and, for example, may be used to determine a relationship rating that is then compared to the threshold parameters provided by originating user Ω.

Once the optimized distribution network has been determined by optimization server 54, optimized distribution data 24 including at least part of the optimized path is provided to device 11 via connection 20. Device 11 then uses the optimized distribution data to prepare content distribution package 30 to distribute in accordance with the optimized distribution path. Since the distribution package 30 includes at least a part of the optimized path data, downstream users may automatically distribute the package based on the optimized path.

A series of exemplary content distributions by user Ω will now be discussed in conjunction with FIGS. 5-7. These figures show the distribution path of a first, second, and third distribution by user Ω involving certain members of distribution network 10. FIG. 5 illustrates a portion of distribution network 10 used by user Ω, for example, in a first content distribution in which user Ω shares a home video. User Ω originally may request an optimized distribution network and provide data including content metadata describing the home video; however, in this case, the example will proceed on the assumption that no distribution optimization has occurred. For example, distribution history store 54 may have no relevant data for the distribution. Alternatively, user Ω may choose to carry out the first distribution manually.

In any event, user Ω distributes a distribution package related to the home video to users A and B. User A relays to the video to user C, while user B relays the video to user D. In this example, as noted above, each user relays a distribution package to downstream user(s); however, the principles and teachings discussed herein are equally applicable to embodiments in which the actual content files are sent between users. User C relays the distribution package to user L. For each distribution, one or more computing devices associated with each user reports distribution progress data to optimization server 52, which maintains a record of the first distribution in distribution history store 54.

Some time afterward, user Ω begins a second distribution, this time of a second home video. FIG. 6 illustrates the path of the second distribution. As with the first distribution, optimization server 52 and history store 54 may not have sufficient data to determine an optimized distribution for the second home video, or user Ω may have chosen to also carry out the second distribution manually. User Ω sends the distribution package (or content in alternative embodiments) to users A and B. In this distribution, user B relays the package to user M. User M relays the package to users N and O. As before, data regarding each subsequent distribution is reported back to optimization server 52, which maintains a record of the second distribution in distribution history store 54.

Assume that user Ω is preparing a third distribution, this time relating to a third home video. User Ω may select A and B for the initial distribution. The selection may be automatic, for example, based on the initial distribution lists for the previous videos. Alternatively or additionally, user Ω may pick and choose recipients from an address book, social network, buddy list, or other suitable source. Distribution manager 100 running on computing device 11 provides the initial distribution and content metadata describing the third home video as part of proposed distribution data 22 sent to server 52. However, in this case, optimization server 52 discovers sufficient data to determine an optimized distribution path for the third distribution. For instance, optimization server 52 may prepare a combined distribution network based on correlating content metadata describing the third home video to content metadata associated with the records for the prior distributions. In this example, the first, second, and third videos may relate to similar subject matter. Optimization server 52 prepares the combined distribution network shown in FIG. 7A, which in this example, comprises the first and second distribution networks meshed together.

Generating a combined distribution network may proceed in any suitable fashion. For example a social network optimization server (which may be server 52 and/or another device or devices) can utilize previous network interactions, including social network instances, user parameters, content classification, user classification, distribution history, existing social network distributions, and other external data to optimize a social network. Contextual data, such as time of day and/or locations of user Ω and/or other users in the social network may be considered, as well. Based on user preferences, the system can merge selected social network interactions into a single social network and then find the optimal path to each particular user to determine that user's level in the network. The system can further optimize the user's level by utilizing other influences such as user classification and previous distribution history of related content.

However, distribution path optimization can be carried out independently of combination, adjustment, and/or other manipulation(s) of particular social networks. For example, it is conceivable to simply merge past distributions and then determine an optimized distribution path. Further optimization of the underlying network structure and/or user positions may be carried out later, or not at all. Alternatively, distribution path optimization may be carried out simultaneously as part of one or more other optimization processes.

After generating an appropriate combined distribution network for use as a baseline, optimization server 52 may access additional data from distribution history store 54 to obtain an optimized distribution network. For example, as noted above, in the first and second distributions, at least some of the downstream recipients reported back on the distribution progress. The various factors discussed hereinabove may be used by optimization server 52 to determine path strengths between the various users in the combined distribution network. FIG. 7B illustrates the combined distribution network from FIG. 7A with path strengths applied.

For example, assume that, although user C distributed the first video to user L, user L did not download the first video at all. Accordingly, the C-L link may therefore be rated relatively low. As a further example, assume that users B and M, and users M and O, exchange a great deal of content matching the metadata for the first, second, and third videos. Data indicative of such exchanges may be in distribution history store 54, for example, based on reports back regarding other distributions that did not involve user Ω but did include robust B-M and M-O sharing activity. Accordingly, the B-M and M-O links are rated as relatively strong.

Optimization server 52 next compares originating user Ω's threshold value(s) for distribution to determine the social network used for optimal distribution. If user Ω sets a very low threshold, the content will be distributed down more paths in the combined network than if user Ω sets a very high threshold. For example, if user Ω sets a threshold of "5", optimization server 52 will return the optimized distribution network shown in FIG. 7B. The optimal distribution network is indicated by solid lines in FIG. 7B, while the non-optimal paths are indicated in dashed lines. The optimized distribution network is then included in content distribution package 30 sent by distribution manager 100 running on device 11. Continuing with the example from above, the content distribution package will be sent from user Ω to user A and user B and then onward to the other users.

In some embodiments, the content distribution package may include more or less of the combined distribution network. For example, the distribution package may include only the optimized distribution network and related path strengths. Alternatively, the distribution package may include the combined distribution network, path strengths, and the originating user's threshold value(s). Further optimization of the package contents may include dividing the package into portions—for example, a particular branch may receive only portions of the distribution path pertinent to that branch. For example, in exemplary distribution network 10 of FIG. 1, distributions to E, F, G, and H do not have any connections to distributions to users A, C, and L. Therefore, in a hypothetical distribution involving all of those users using the paths as illustrated, the E-branch and A-branch may only receive their respective portions of the optimized distribution network.

In some embodiments, each downstream user may receive distribution package 30 and then automatically forward it to the next user(s) in the distribution path. For example, distribution manager 100 running on user B's device will distribute the package to user M, and user M's device will distribute the package to user O. However, each downstream user may optionally expand or contract the distribution in accordance with the downstream user's preferences.

For example, distribution manager 100 running on a given downstream user's computing device may access the optimized distribution path included with the received distribution package. Distribution manager 100 may then compare the path strengths in the distribution path to the downstream user's own threshold value(s) for redistributing content. A downstream user may assign threshold values based on attributes including, but not limited to, the following: number of levels away from the originator of the content, content type, content owner or creator, and other content metadata. For example, a downstream user may define a low threshold for content originated by a family member and define a high threshold for content coming from a user that is many levels removed form the social network.

As an example, assume user B receives data representing the optimized social network including path strength values as illustrated in FIG. 7B. The optimized path for this distribution calls for user B to redistribute the content to user M, but not to user D based on user Ω's threshold value of "5." However, assume that user B has set a threshold value of "2" for content received from user Ω. For example, user B may view user Ω as a close friend and/or good source of shared content. As a further example, user B may have specified a threshold of "2" with regard to forward distributions to user D. Distribution manager 100 running on user B's device sends the distribution package to users D and M and provides distribution progress data to optimization server 52 noting B's actual distribution of the package.

In some embodiments, user B distributes the package as received from user Ω. However, in alternative embodiments, downstream users such as user B may change the optimized distribution path based on the downstream user's own threshold value(s). For example, if user B sets a threshold value of "2" for this particular distribution, the M-N link also meets the threshold for inclusion. Thus, user B may redistribute a modified version of the distribution package including M and N in the optimized path. The optimization system may support user controls so that users such as Ω may preclude downstream users from altering the optimized path or limit the degree to which users can alter the optimized path.

In some embodiments, downstream changes to the distribution path may be based on information provided to downstream users about data related to other nodes in the distribution. For example, a downstream user may base decisions as to whether or not to forward a content distribution package on actions taken by one or more upstream nodes. For instance, user B may set a rule that user B's device will not distribute any packages that were deleted by the sending user without the sending user having downloaded/viewed the content. Such information may be appended to the distribution package, or may be provided as part of a distribution update by server 52. In embodiments in which the information is provided by the server, distribution progress data may be provided with or without changes or other distribution path optimization updates, for example.

As another example, downstream users may be provided with information as to how a package arrived at the downstream user, and such users may use such information in decisions as to whether or not to forward a content distribution package. For instance, as noted above, the distribution package may include all or part of the distribution path. However, in some embodiments, the package may include data regarding the actions taken by one or more upstream nodes. For example, if a package is manually forwarded to a node that forwards the package to B, the package may be appended with additional data regarding its progress through the network. Additionally or alternatively, such information may be based on data provided to optimization server 52 that is relayed to the receiving node.

Figure 8:
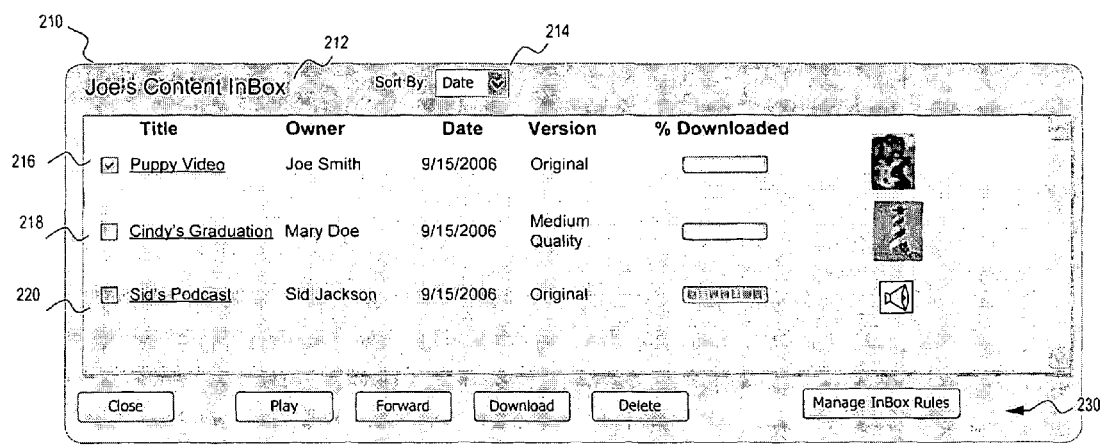
FIG. 8 depicts an exemplary queue management application user interface.

As was noted above, each user's computing device further provides a queue management application 200 which allows each user to specify and prioritize downloads of shared content based on distribution package metadata. FIG. 8 illustrates an exemplary user interface associated with the queue management application. Interface window 210 includes title 212 and view selection 214, shown in this example as an option for sorting the content queue. In this example, three content distributions are illustrated, distribution 216 ("Puppy Video"), distribution 218 ("Cindy's Graduation"), and distribution 220 ("Sid's Podcast"). Window 210 further includes queue command area 230, which in this example includes a plurality of command buttons.

Using interface window 210, a user can interact with queue management application 200 in order to determine what actions to take with regard to automatically-shared content. For example, if the user has received content which the user has no interest in viewing, the user may choose "delete" to remove the content from the queue entirely. Alternatively, the user may select one or more items to download. When an item is selected for download, queue management application 200 accesses data included in the distribution package associated with that content to determine what local and network resources to utilize to access the content.

For example, if the user chooses to download the content from distribution 220, queue management application 200 may determine the network address for "Sid's podcast" and begin the download process. In this example, window 210 displays that "Sid's podcast" is nearly completely downloaded. Once the download is complete, the user may select "play," and queue management application 200 may launch the appropriate application to play the podcast. Queue management application may be configured to automatically launch the application upon completion of the download, of course.

Command button "forward" may be used by the user to share content with additional users, such as initiating manual sharing of content that, as noted above, may influence the optimization process. For example, while distribution 218 ("Cindy's Graduation") is selected, the user may choose the "forward" button and be presented with a distribution selection screen. The user may be presented with a list of contacts, a depiction of one or more social networks, or a depiction of the distribution network for distribution 218, for instance.

Selection of the "manage inbox rules" button may launch a window or other interface for the user to fine-tune content sharing and distribution parameters. For example, as noted above, distribution manager 100 may widen or narrow distribution of content based on a user's preferences, such as threshold values. The user may set and adjust such values using the "manage inbox rules" option of queue management application 200.

Furthermore, queue management application 200 may support other parameters with regard to received content. For example, a user may specify certain actions to automatically be taken upon receipt of certain distributions. All content received from some users may be automatically deleted, while other content may be flagged for automatic download. As an example, assume that user D wishes to automatically delete any shared content originating from user $\Omega$. User D may direct queue management application 200 to automatically delete any content package that originates from user $\Omega$. As a further example, user D may direct queue management application 200 to automatically take action based on one or more link strengths in the distribution path included with an incoming package. For instance, queue management application may compare the incoming link threshold value to a local threshold value and automatically delete content, say, from a very low-strength link.

In many instances, based on feedback to the optimization server 52, user D should become less likely to be included in optimized distributions for content disliked, ignored, or otherwise unwanted by user D. For example, assume user D is a baseball fan, but despises user $\Omega$'s favorite team. User $\Omega$ repeatedly distributes highlight videos of the team, but user D has specified a rule to delete any distribution package originating from user $\Omega$ with content metadata indicating it is a baseball highlight video of user $\Omega$'s favorite team. Data reflecting user D's deletions is reported back to optimization server 52 for inclusion in distribution history store 54. Accordingly, when user $\Omega$ requests an optimized distribution for future baseball videos, the path leading to user D (in this case the B-D link) should be reduced in strength. Therefore, unless user $\Omega$ sets an exceedingly low threshold for distributions of the baseball videos, user D should eventually drop out of the optimized distribution lists.

Of course, as noted above, it is feasible for an upstream user such as user B to broaden the distribution. For example, user B may set an exceedingly low threshold value for baseball distributions from $\Omega$ for the express purpose of routing unwanted content to user D. Therefore, the queue management application 200 allows for each downstream user to ultimately decide which content is viewed by the user. Each downstream user's network resources are also conserved in embodiments in which the downstream user receives distribution packages and not the actual shared content. Therefore, a downstream user does not waste bandwidth and other resources downloading automatically-shared, but unwanted, content. Furthermore, feedback provided by user D's distribution manager may continually lower the B-D link, at least with regard to user $\Omega$'s videos, if user D continually rejects the videos despite B's best efforts.

In some embodiments, the distribution optimization system may support various types of manual opt-outs by users. For example, user D may be able to specify that he is not to be included in distributions matching one or more parameters. Such parameters could include blocking distributions received from certain users (directly and/or indirectly), distributions matching certain parameters (i.e. subject matter, file type, file size, etc.) time-of day restrictions, location-based restrictions, and so forth. Opt-outs could be handled at the client level (i.e. queue management application 200 discards any content for which the user has opted out) and/or at the system level. For example, in some embodiments, the user provides opt-out parameters to the server and, as part of the initial optimization process and/or an update to an ongoing distribution, the user is removed from the recipient list of any distribution of content for which the user is deemed to have opted out based on the opt-out parameters.

As was noted above, optimized paths may change based on incoming feedback as to the progress of other distributions. For example, after a particular distribution has been optimized and is still in progress, feedback data regarding one or more other distributions may add additional paths or reduce the strength of others. Returning to the examples regarding user $\Omega$'s first, second, and third video distributions, assume that the optimized path shown in FIG. 7B was determined and the third distribution initiated based on that optimization. However, the second distribution may have not fully completed—assume, for instance, that user O manually distributes the second video to users P and Z as shown in FIG. 9A sometime after the third distribution has begun. Feedback data regarding the additional distributions is reported back by O's distribution management application (and/or distribution management applications of P and/or Z) and included with distribution history store 54's record(s) for the second distribution.

In embodiments that support ongoing distribution optimization, optimization server 52 may note the occurrence of a change to history data that was used to optimize an ongoing distribution and take further action based on the change(s). For example, server 52 may recalculate the optimized distribution path for the third distribution. If the change in the distribution history data results in a change to the optimized distribution, optimization server 52 may be further configured to intervene in the affected active distribution(s) and update the previously-optimized paths. For example, optimization server 52 may access distribution history data for the ongoing distribution(s) to determine, for each ongoing distribution to be updated, one or more nodes which should receive an update to the optimized distribution. Alternatively, the optimization server 52 may distribute the update to all nodes in a distribution.

Ongoing distribution optimization and updates to ongoing distributions may utilize the same rules, parameters, values, preferences, and the like that are used to determine initial optimized distribution paths. However, ongoing optimization may use different parameters, rule sets, weightings, etc. For instance, manual forwarding as a distribution is occurring may be valued more highly than other types of forwarding. As an example, if a user is manually forwarding content received in a first distribution to many other users not included in the optimized path, data regarding the manual forwarding may be used to influence other distributions more heavily than if the user was forwarding content automatically.

Continuing with the example from above, assume that the O-P distribution path is included in the revised optimized distribution path for the third distribution. Assume further that user Z fails to take any action regarding content received from O and as a result the link has a weak strength rating. The O-Z path may therefore not be included in the revised optimal distribution. The revised path is illustrated in FIG. 9B. The revised path may be distributed to one or more nodes in the third distribution. For example, the revised path may be distributed to user O so that user O automatically redistributes the third video to user P.

One of skill in the art will appreciate that updates to an optimized distribution may have farther-reaching effects than illustrated in the example above regarding the newly-added links from user O. For instance, addition of one link may open (or close) whole areas of a distribution network. Taking a second example separate from the first, second, and third video distributions, assume that $\Omega$ regularly distributes a podcast to users A, B, and D. Assume further that sufficient distributions have occurred so that distribution history store 54 returns an optimized path of $\Omega \rightarrow A$ and $\Omega \rightarrow B \rightarrow D$. Accordingly, user begins an automated distribution of the latest podcast. However, assume that while the distribution is in progress, user B begins manually forwarding content to user M. The content may comprise previous editions of user $\Omega$'s podcast and/or content having similar metadata. For example, user B may forward a different podcast regarding the same topic to user M.

In any event, the B-M link becomes relevant to distribution of $\Omega$'s most recent podcast while such distribution is in progress. Optimization server 52 may forward data to user B directing user B's computing device to automatically distribute the podcast's distribution package to user M. In this example, user M is a "gateway" to users N, O, P, and Z. Depending upon past distributions over the respective links, any or all such users may be further added to the optimized distribution path for $\Omega$'s podcasts once M is connected.

Updates may be configured to occur at specified intervals and/or may be event-driven. For example, distribution server 52 may periodically review ongoing distributions and check for changes in the underlying history data used for each ongoing distribution. Based on the changes, the distribution optimization server 52 may determine which prior optimized paths require updating. For example, users may specify threshold or preference parameters as to the degree of change which warrants an update to an ongoing distribution. As another example, users may specify preferences or rules for event-based triggering of updates. System parameters may control the scope of updates to ongoing distributions, as well. For example, one or more time limits may be used to determine which distributions are "ongoing." The time limit may be based on any suitable parameters, such as the date/time of initiation, date/time of last reported distribution activity, etc. Updates to optimized distribution paths may be calculated and/or distributed to clients in the path in real time or near-real time.

As was noted above, embodiments of the distribution optimization methods, distribution optimization systems, and methods of distribution may be found in systems that provide additional content-sharing functionality. For instance, downstream users may be limited by the distribution system with regard to content modification, viewing, and/or redistribution depending upon the content sharing system that is used. For example, users may be precluded from sharing content (and/or content distribution packages) by rules and/or licenses associated with the shared content.

One of skill in the art will appreciate that content sharing may be partially or fully automated based on the functionality provided by optimization server 52 in conjunction with user software. Using the example above, user U's podcast creation software may include a menu option that invokes the content distribution manager upon creation of a new podcast. The distribution manager may gather content metadata and send the metadata to optimization server 52. Server 52 then returns optimal distribution data based on other distributions of content having metadata similar to the podcast, and distribution manager 100 uses the optimal distribution data to create a content distribution package 30 for the podcast. Distribution manager 100 then sends to completed distribution package 30 without any further intervention necessary on user $\Omega$'s part. Of course, as noted above, user $\Omega$ can specify additional parameters, particular recipients, and the like. Furthermore, other content types and creation tools may be used, as well.

Exemplary embodiments discussed herein used one or more central optimization servers in conjunction with peer-distributed content distribution packages. However, one of skill in the art will recognize that the various components and functionality of the distribution system may be distributed in a variety of configurations. For instance, a central server could distribute the content distribution packages to all or some of the downstream peers. Similarly, the same central server could provide optimization functionality and/or provide the actual content that is shared based on the distribution package content.

In still further alternative embodiments, each device in the system maintains a local version of distribution history store 54 and the optimization process proceeds on a level-by-level basis as content packages are received. For example, when a new content distribution package is received by a computing device, the device determines recipient(s) in one or more downstream levels based on data from the local distribution history store and sends the package accordingly. The device may then provide distribution feedback to the source of the package (and/or other devices specified in the package). After one or more downstream devices have received the package, the sending device receives distribution feedback for inclusion in the local distribution history store. Feedback data may move directly or indirectly upstream as distribution packages are received.

It is appreciated by persons skilled in the art that what has been particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed:

1. A method comprising:
   in a computing device programmed to automate content distribution, receiving proposed distribution data defining a proposed distribution of new content;
   wherein the proposed distribution data includes an initial distribution list identifying a first plurality of recipient client devices and metadata describing the new content;
   accessing, by the computing device, distribution history data comprising a plurality of records, each record corresponding to a previous distribution of content and including metadata describing the previously-distributed content, at least some of the records identifying a path of a plurality of successive recipient client devices that previously received the previous distribution of content;

generating, by the computing device, an optimal distribution path for the new content including a distribution list identifying an initial plurality of recipient client devices to which the new content should be initially distributed and a subsequent plurality of recipient client devices to which at least one of the initial plurality of recipient devices should subsequently distribute the new content, based on the proposed distribution data and the at least some of the records;

receiving, by the computing device, distribution progress data for at least one ongoing distribution;

updating, by the computing device, the distribution history data based on the distribution progress data;

generating, by the computing device, a new optimal distribution path based on updated distribution history data; and distributing, by the computing device, subsequent content according to the new optimal distribution path.

2. The method as set forth in claim 1, wherein generating the optimal distribution path further comprises:

generating a combined distribution path for the new content;

wherein the combined distribution path comprises a combination of a plurality of distribution paths for previously-distributed content having similar metadata to the metadata describing the new content;

calculating a strength of relationships between each client device in the combined distribution path to determine a relationship strength for each link in the combined distribution path;

comparing the relationship strength for each link to a threshold; and including, in the optimal distribution path, only those client devices from the combined distribution path that are connected by a link that satisfies the threshold.

3. The method as set forth in claim 1, further comprising:

sending data adjusting the optimal distribution path for the at least one ongoing distribution based on one or more updates to the distribution history data.

4. The method as set forth in claim 3, wherein the optimal distribution path for the at least one ongoing distribution is updated based on one or more updates to the distribution history data, wherein said one or more updates are based at least in part on distribution progress data for a distribution other than the one being updated.

5. The method as set forth in claim 3, wherein receiving distribution progress data, updating the distribution history data, and sending data adjusting the optimal distribution path for the at least one ongoing distribution occur substantially in real-time.

6. A non-transitory computer software product comprising at least one non-transitory computer-readable storage medium embodying program instructions, which, when executed by one or more computing devices, cause the one or more computing devices to perform actions including:

receiving proposed distribution data defining a proposed distribution of new content;

wherein the proposed distribution data includes an initial distribution list identifying a first plurality of recipient client devices and metadata describing the new content;

accessing distribution history data comprising a plurality of records, each record corresponding to a previous distribution of content and including metadata describing the previously-distributed content, at least some of the records identifying a path of a plurality of successive recipient client devices that previously received the previous distribution of content;

generating an optimal distribution path for the new content including a distribution list identifying an initial plurality of recipient client devices to which the new content should be initially distributed and a subsequent plurality of recipient client devices to which at least one of the initial plurality of recipient devices should subsequently distribute the new content, based on the proposed distribution data and the at least some of the records;

receiving, by the computing device, distribution progress data for at least one ongoing distribution;

updating, by the computing device, the distribution history data based on the distribution progress data;

generating, by the computing device, a new optimal distribution path based on updated distribution history data; and distributing, by the computing device, subsequent content according to the new optimal distribution path.

7. The product as set forth in claim 6, wherein the program instructions cause the one or more computing devices to perform actions further including:

sending data adjusting the optimal distribution path for an at least one ongoing distribution based on one or more updates to the distribution history data.

8. The product as set forth in claim 7, wherein the program instructions cause the one or more computing devices to receive distribution progress data, update the distribution history data, and send the data adjusting the optimal distribution path for the at least one ongoing distribution substantially in real-time.

9. The method of claim 1, wherein the at least some of the records further comprise data identifying whether each recipient client device of the plurality of recipient client devices played the content or did not play the content.

10. A method comprising:

identifying, by a computing device, an originating user as an initial source of first digital content for a particular first instance of digital content distribution;

receiving, by the computing device, first proposed distribution data for the first digital content including a first initial distribution list and digital metadata describing the first digital content;

distributing, by the computing device, to a computer network the first content according to the proposed distribution data;

receiving by the computing device through the computer network distribution progress data from computing device clients that have received the first digital content including successive recipient client devices that received the first digital content from intermediary client devices;

storing, by the computing device, records associated with the distribution progress data;

creating, by the computing device, distribution history data based on received distribution progress data;

identifying, by the computing device, second digital data to be distributed from the computing device;

receiving, by the computing device, second proposed distribution data for the second digital data including a second initial distribution list and digital metadata describing the second digital content;

accessing, by the computing device, the distribution history data including one or more of the records; and generating, by the computing device, an optimal distribution path for the second digital content including a second distribution list identifying an initial plurality of recipient client devices to which new content should be initially distributed and a subsequent plurality of recipient client devices based on the proposed distribution data and the at least some of the records.

11. The method of claim 10, wherein generating the optimal distribution path further comprises:

generating a combined distribution path for the new content;

wherein the combined distribution path comprises a combination of a plurality of distribution paths for previously-distributed content having similar metadata to the metadata describing the new content;

calculating a strength of relationships between each client device in the combined distribution path to determine a relationship strength for each link in the combined distribution path;

comparing the relationship strength for each link to a threshold; and including, in the optimal distribution path, only those client devices from the combined distribution path that are connected by a link that satisfies the threshold.

* * * * *